UNITED STATES PATENT OFFICE.

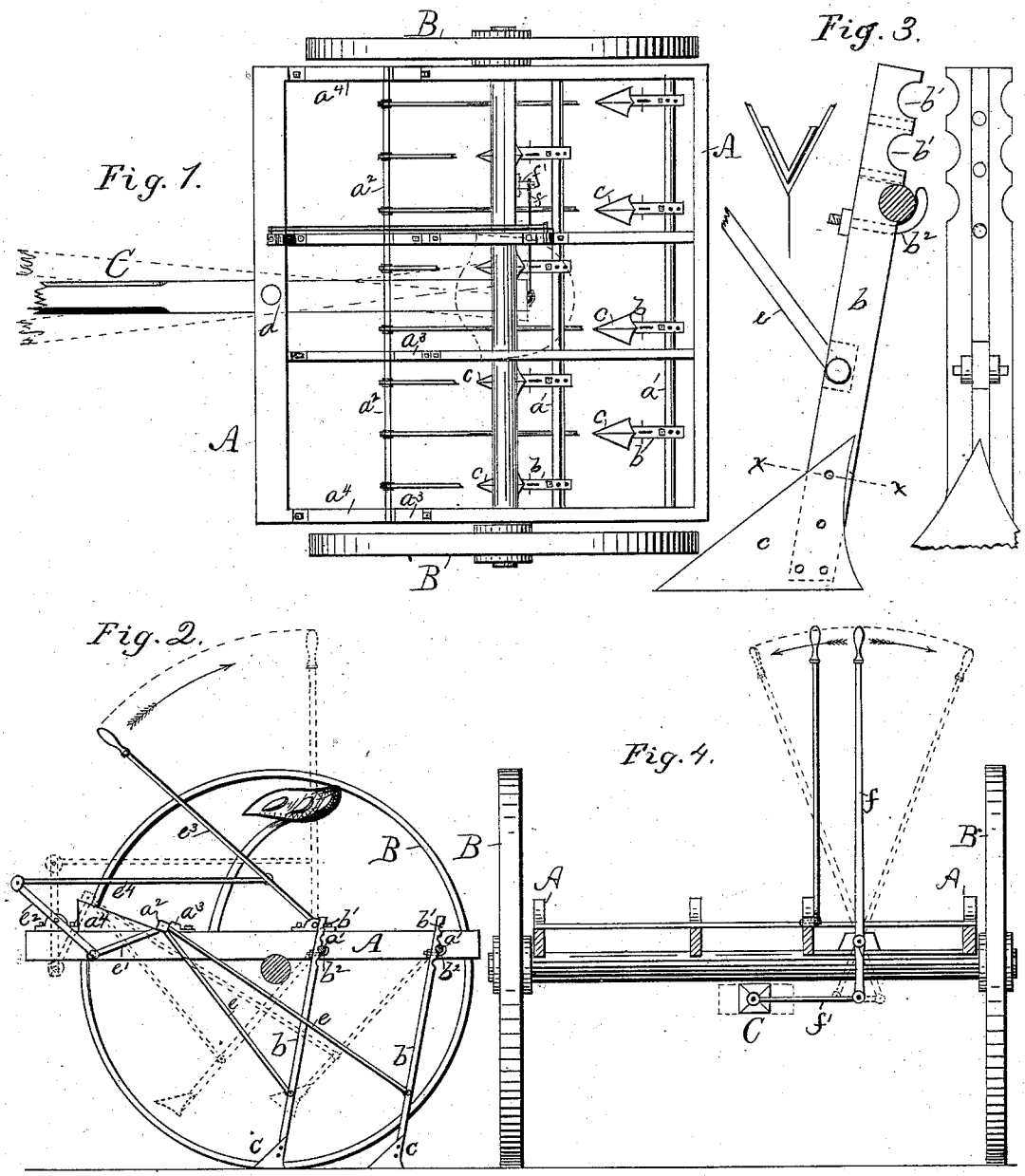

CLINTON MENDENHALL, OF MARTINSBURG, WEST VIRGINIA.

CULTIVATOR.

SPECIFICATION forming part of Letters Patent No. 241,687, dated May 17, 1881.

Application filed February 17, 1881. (No model.)

*To all whom it may concern:*

Be it known that I, CLINTON MENDENHALL, a citizen of the United States, residing at Martinsburg, in the county of Berkeley and State of West Virginia, have invented a new and useful Improvement in Cultivators, of which the following is a full, clear, and exact description, reference being had to the annexed drawings, forming part of this specification.

The object of my invention is to provide a cultivator which shall be adapted for cultivating different kinds of grain, and for use upon stony or stumpy ground.

My invention consists in a wheeled frame, having lugs and inclines on its forward end, and a system of levers and shafts, by means of which the plows may be lifted out of the ground, as hereinafter described and claimed.

In the accompanying drawings, Figure 1 represents a plan view of my invention without the levers for manipulating the plows; Fig. 2, a side elevation, showing said levers; Fig. 3, detail views of the plow and foot-piece; and Fig. 4, a rear view of the cultivator, showing the lever for guiding the tongue, the plows not being shown.

Referring to the drawings, the square or rectangular frame A is supported upon the two wheels B, and provided with a tongue, C, pivoted to its forward part at $a$, so as to allow an oscillating movement. The frame is provided with two parallel shafts or rods, $a'$, extending from side to side, to which are secured two sets of foot-pieces, $b$, for carrying the plows $c$. The said foot-pieces are provided with a series of grooves, $b'$, across the rear portion of their upper ends, into which the said rods are adjustably held by bolts $b^2$, curved at their rear ends, so as to form a rest for the same.

At the lower ends of the foot-pieces are attached plows or shoes $c$, made of a nearly-square piece of metal bent diagonally in order that it may be used reversibly. These plows are so arranged that those in the rear shall pass between the furrows made by the forward ones, whereby the soil may be completely broken, or by removing certain of the plows the cultivator may be adapted for cultivating corn, &c.

To the forward part of said foot-pieces are pivoted levers $e$, having their forward ends loosely secured to a cross-rod, $a^2$, which rests upon wedges or inclines $a^4$ on the forward part of the frame, and by means of lugs $a^3$ limits the backward movement of the plows. The said rod rests upon the wedges $a^4$ near their points, and is connected, by means of a short lever, $e'$, to the lower end of a lever, $e^2$, pivoted at its center to the front of the frame, and having its upper end connected to the hand-lever $e^3$ by lever $e^4$, so that when the hand-lever is brought to an upright position the said rod will slide up the inclined surface of the wedge and draw the plows forward out of the ground to enable them to pass obstructions.

A means for guiding the cultivator is provided in the oscillating tongue C, which is pivoted to the forward part of the frame, and has its rear end connected, by means of lever $f'$, to an upright hand-lever, $f$, which is pivoted to the frame. By this means the cultivator can be used along the side of a hill, or for cultivating crooked rows of corn, without the usual inconvencies in such cases.

Having thus described my invention, what I claim as new, and desire to secure by Letters Patent, is—

In a cultivator, the wheeled frame A, having lugs $a^3$ and parallel inclines $a^4$ at its forward end, in combination with cross-rod $a^2$, levers $e$, $e'$, $e^2$, $e^3$, and $e^4$, shafts $a'$, foot-pieces $b$, and plows $c$, substantially as shown and described.

CLINTON MENDENHALL.

Witnesses:
A. G. LYNE,
SOLON C. KEMON.